Oct. 10, 1961     J. M. HUNT     3,003,250
GROUNDED AIRCRAFT TRAINER

Filed April 12, 1957     2 Sheets-Sheet 1

John M. Hunt
INVENTOR

BY Richard D. Stephens
ATTORNEY

JOHN M. HUNT
INVENTOR

BY Darby & Darby
ATTORNEYS

United States Patent Office 3,003,250
Patented Oct. 10, 1961

3,003,250
GROUNDED AIRCRAFT TRAINER
John M. Hunt, Binghamton, N.Y., assignor to General Precision Inc., a corporation of Delaware
Filed Apr. 12, 1957, Ser. No. 652,544
3 Claims. (Cl. 35—12)

The present invention relates to the simulation of the rate of turn of a simulated flight in grounded aircraft trainer apparatus, and more particularly, to improved means for simulating the rate of turn indicator for simulated flight in a grounded aircraft trainer.

The rate of turn indicator has been a fundamental instrument of paramount importance since the earliest days of instrument flight. Idealistically, it would be desirable if the rate of turn indicator were of a nature to give the pilot an indication of the rate of change of heading of the aircraft with respect to ground, $\dot{\psi}$. However, because of many technical difficulties, one of which being a lack of ready reference to ground in the aircraft, the prime mover of this device (modified as set forth below) has always been a measure of the angular velocity of the aircraft about its vertical or Z axis, and the instrument has often been calibrated to indicate the desired rate of change of heading, $\dot{\psi}$, under standard operating conditions, such as level flight and a fixed bank angle based on a "standard rate turn," at the cruising velocity of the aircraft. This device usually is gyroscopic in nature and is mounted in a gimbal system such that the rotor spin axis (and the gimbal ring in which the spin axis is mounted) is free to rotate, against restraining springs, in a plane perpendicular to the aircraft fore and aft or X axis, but rigidly restrained against rotation about the aircraft vertical axis, the normal position of the spin axis being parallel to the aircraft Y or wing tip to wing tip axis. With the gyro mounted in this manner the turning or rotation of the aircraft about its Z axis will effectively rotate the mounting base of the gyroscopic device and precess the rotor spin axis in a plane perpendicular to the aircraft fore and aft or X axis against the aforementioned restraining springs.

These springs perform two functions. One is to apply a force through the gyro spin axis tending to precess the rotor to turn in the same plane and at the same rate as the aforementioned mounting, so long as the aircraft continues its rate of turn or rotation about its Z axis. The other is to return the spin axis to a position parallel to the Y axis when the aircraft is not turning. Since the mounting base and spin axis are both gyroscopically and mechanically connected to each other any change in the rate of angular movement of the mounting must cause a change in the precession rate of the spin axis. Thus the rate of angular movement of the mounting must cause a change in the precession rate of the spin axis. Thus the rate of angular movement of the mounting base must always be balanced by precessional displacement against the spring about an axis parallel to the "X" or fore and aft axis of the aircraft at right angles to the plane of rotation of the mounting base of the gyro.

The mounting and operation of the restrained gyroscope with one degree of freedom as set forth above is not without shortcomings, for it is responsive to an aircraft rate of turn $r$, and unaffected by the rate of roll $p$ and the pitching rate $q_1$ of the aircraft, only under the limited condition when these latter two quantities represented as vectors have no components perpendicular to the plane of the gimbal ring mounting for the spin axis, where the rate of roll $p$ and the pitching rate $q_1$ are the angular velocities of the aircraft about the "X" and "Y" axis, respectively. However, once the spin axis is displaced from a position parallel to the "Y" axis of the aircraft, thereby indicating a rate of turn of the aircraft about its "Z" axis, the pitching rate $q_1$ (but not the roll rate $p$) does have a component perpendicular to the plane of the gimbal mounting for the spin axis, thereby providing an additional component to the precession rate being measured. This precession rate is measured by an additional displacement of the gyro spin axis, in a plane perpendicular to the aircraft fore and aft or X axis, against the aforementioned restraining springs. Depending on the algebraic sign of $q_1$ and $r$ and on the direction of rotation of the gyro rotor, this decreases or increases the effect of the pitching rate $q_1$ on the rate measuring means, which, in turn, increases or decreases the precessional displacement, etc. If the pitching rate $q_1$ continues, the rate of turn indicating means becomes regenerative or degenerative.

Thus the real instrument, instead of measuring and indicating the true rate of turn $r$ (except as calibrated to indicate $\dot{\psi}$ under standard conditions) will have an indication based on a contribution from the pitching rate $q_1$. This effect is particularly observable during certain maneuvers, such as a loop involving high pitching rates, and has the additional effect of increasing or decreasing the sensitivity of the instrument.

The complexity and great cost of modern aircraft has greatly increased the hazard and cost incident to training the novice and refreshing experienced pilots. As a result there has been an increase in the use of simulated aircraft trainers of the grounded type in which the student may learn at little cost and with no hazard to himself, to others, or to the aircraft. As is well known to those skilled in the art, most modern grounded trainers solve the equations of motion of an aircraft by means of analogue computer equipment to provide instrument and other output indications simulating those indications which would appear on actual aircraft instruments and indicators under similar aerodynamic conditions. It will be obvious that the value of such training is measured by the realism with which the simulated aircraft presents the student with the actual environment of a real aircraft. One of the indicators where realism is of immense importance is the rate of turn indicator.

Prior art grounded flight trainers have provided for the simulation of rate of turn indicators in a number of ways. One early means involved driving a tachometer by the conventional heading shaft, thereby deriving a voltage whose polarity and magnitude was commensurate with the direction and magnitude of the rate of change of heading, $\dot{\psi}$. While this method has some degree of utility, it was entirely too unrealistic with regard to simulating the indication given by an aircraft rate gyro, which indication, with the exceptions already discussed, is usually a measure of the rate of turn $r$ of the aircraft about its Z axis. Other prior art flight trainer designs assumed identity between the indicated rate of turn and the computed rate of turn $r$ as generated by the components of a flight computer. As already set forth above, such an assumption is grossly unrealistic, inasmuch as both the turning rate $r$ and the pitching rate $q_1$ determine the indication of the rate of turn gyro. Still other prior art assumed that the magnitude and direction of the bank angle of a cockpit motion system was an adequate measure of the rate of turn of a simulated aircraft and therefore utilized a pendulum to measure the bank angle of the aircraft and indicate the rate of turn of the simulated flight. The shortcomings and irreconcilable assumptions involved in this method should be obvious in light of the above.

Accordingly the present invention provides improved computational techniques for considering the effects of the pitching rate $q_1$ in addition to the rate of turn $r$ in determining the simulated indication of a rate of turn indicator. This computational technique also includes means for providing the calibration of the simulated instrument without using springs, as in the actual instrument, the sensitivity of which commonly has been selected in order that the indicated rate of turn be equal to the rate of change of heading $\dot{\psi}$ during the bank angle resulting from a "standard rate turn" at a given airspeed.

It is accordingly a primary object of the present invention to provide an improved means for simulating the rate of turn indicator in a grounded flight trainer.

It is another object of the present invention to provide improved means whereby a more realistic simulation of the rate of turn indication of a simulated rate of turn indicator may be achieved.

It is still another object of the present invention to provide means for simulating the error due to the effect of pitching rate during a turn on the reading of a rate of turn indicator.

It is a further object of the present invention to provide means for a more realistic simulation of the indicated rate of turn including means for calibration according to a "standard rate turn" at a given airspeed.

For a fuller understanding of the nature and objects of the invention reference should be had to the following detailed description taken in connection with the accompanying drawings, in which:

FIG. 3 is a circuit diagram showing one embodiment according to the principles of the invention;

FIG. 4 is a circuit diagram illustrating another embodiment according to the principles of the invention.

Figure 1:
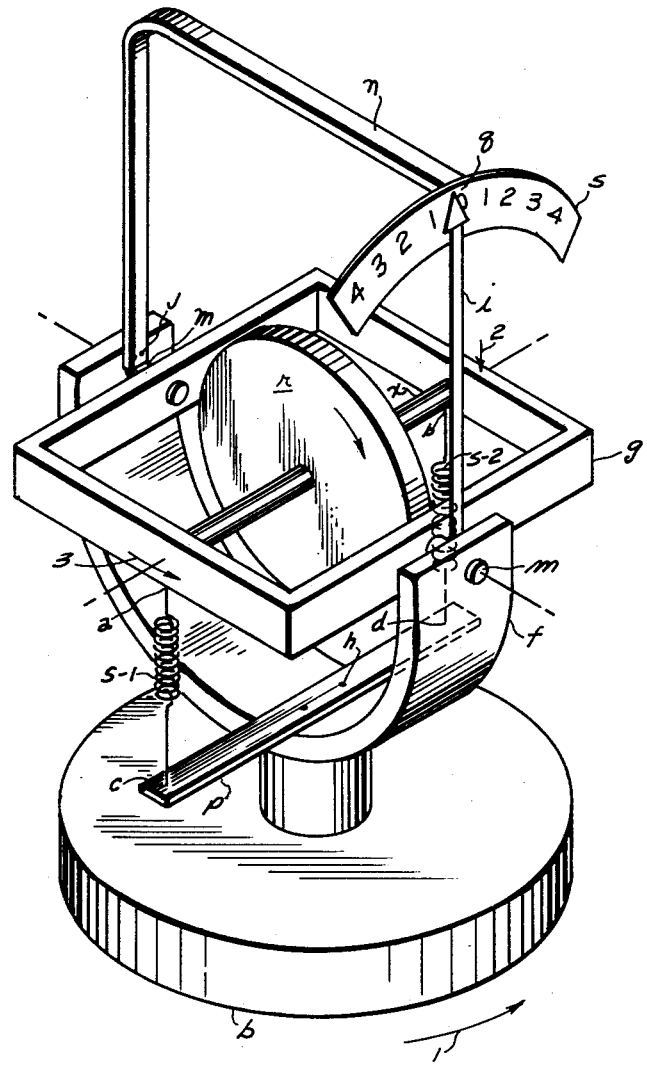
FIG. 1 is a pictorial sketch useful in understanding the present invention.
Figure 2:
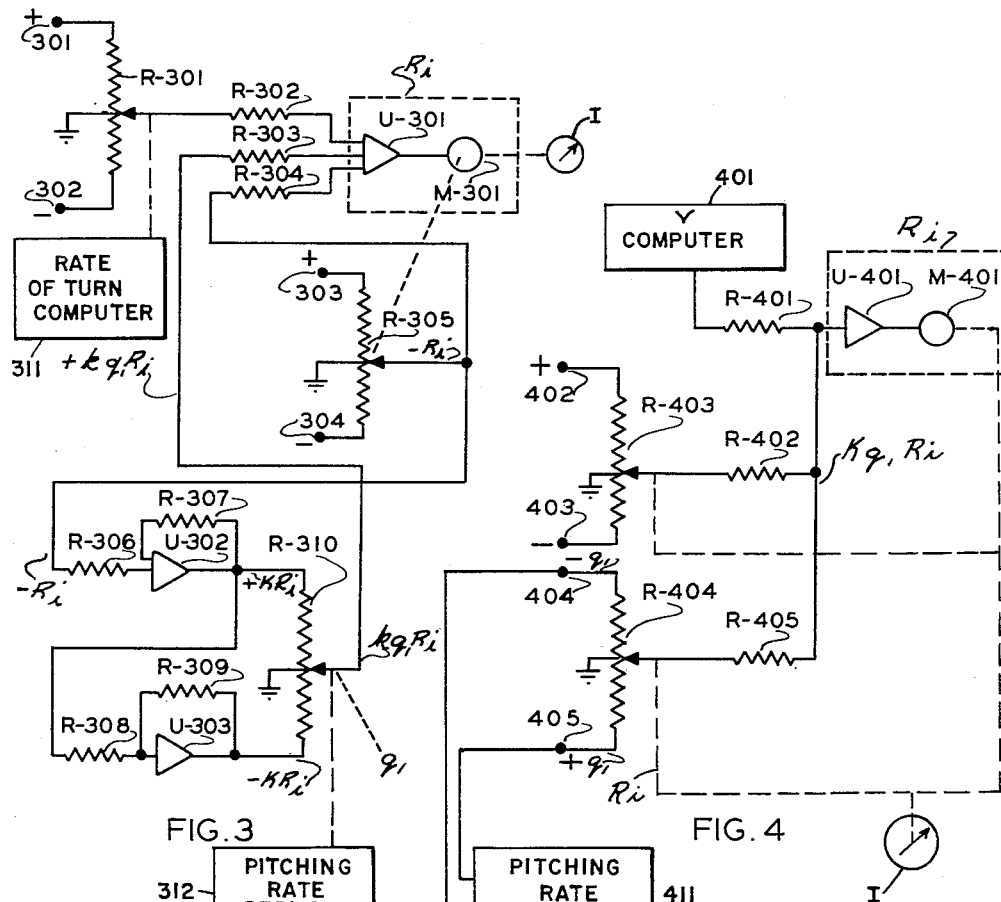
FIG. 2 is a diagrammatic representation of the gyro and aircraft axis system useful in understanding the present invention.
Figure 2:
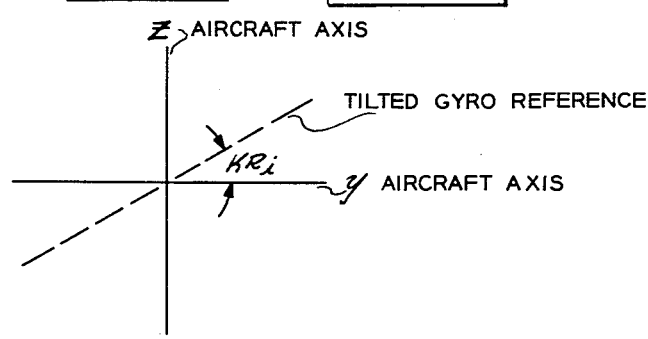

Referring now to the figures, and particularly to FIG. 1, wherein is shown in pictorial form the principles of operation of a rate gyroscope and gimbal system of the type encountered in a real rate of turn indicator, the instrument consists essentially of a rotor $r$ affixed to the spin axis which is free to rotate in bearings in the gimbal ring $g$. The gimbal ring $g$ is itself free to rotate in bearings provided at $m$—$m$ mounted on the frame $f$. Rotation of the gimbal $g$ is constrained against the springs S–1, S–2 affixed at $a$ and $b$ to the gimbal frame, and at $c$ and $d$ by means of the bar $p$, which is itself rigidly affixed to the frame $f$ at $h$. The frame $f$ is also rigidly and integrally mounted to the mounting base $b$ at $h$. Fixedly mounted to the gimbal ring $g$ is a pointer $i$ arranged to be able to move over the quadrant scale $s$ which is fixedly mounted to the bracket $n$ at $q$, the bracket $n$ itself being rigidly mounted to the frame $f$ at $j$.

It will be apparent to those skilled in the art, and by reference to the detailed description of gyrostatic precessional effects contained in copending patent application No. 633,100 filed January 3, 1957 of the present inventor, entitled "Simulation of Errors in an Attitude Gyro" and assigned to the same assignee as the present invention, that if the mounting base $b$ is turned in the direction of arrow, 1, the rotor will tilt, causing spring S–2 to apply a force as indicated by arrow 2. This will precess the rotor to turn with the mounting base as shown at arrow 3. Since, if the base is turned, the rotor axis must turn, precession against the spring will be dependent on the rate of turn of the base, and will be shown as the amount of movement of the needle over the scale. A more detailed description of the operation of a rate gyro may be obtained by reference to a text book entitled "The Gyroscope Applied," pages 27 and 28 written by K. I. T. Richardson and published in November 1954 by Philosophical Laboratory, Inc., 15 East 40th Street, New York, N.Y.

Referring again to FIG. 1, it will be apparent that any angular rotation which has a component about an axis perpendicular to the gimbal ring will cause this ring to deflect by an amount such that, for a particular gyroscope, the spring torque produced by the deflection is sufficient to balance the gyroscope torque caused by that component of angular rotation. Thus the scale showing spring deflections can be calibrated in terms of the angular velocity of rotation being measured. As already suggested above, in addition to the fact that the rate gyro does not measure a pure rate of turn $r$, it is often desired that the indicator provide an indication of the rate of change of the heading $\dot{\psi}$ rather than the rate of turn $r$ of the aircraft about its Z axis. For this reason, either the scale or the force deflection characteristic of the springs may be selected such that the indication is commensurate with $\dot{\psi}$ during a "standard rate turn" of the particular aircraft at its cruising speed. This problem is common to both real and simulated instruments. However, in simulated instruments the additional means afforded by proper scaling of the conventional position servo driving the indicator shaft is available.

The present invention involving flight simulation is concerned with taking the standard flight computer quantity the correct rate of turn $r$ and superimposing on that quantity the errors inherent in the attempted measurement of that quantity in the real aircraft by a rate gyro. In this way, a simulated rate of turn indicator may be provided, calibrated in the same manner as a real instrument or by proper scaling of a position servo driving the indicator.

Considering the following mathematical discussion of the measuring qualities of a simulated rate gyro where:

$R_i$=the indicated rate of turn of a simulated rate gyro type of indicator;
$r$=simulated rate of turn of a simulated aircraft from a conventional flight computer;
$q_1$=simulated pitching rate of simulated aircraft from a conventional flight computer; and
$K$=simulated gyro constant of simulated rate gyro commensurate with the ratio of the precessional displacement of the gimbal ring to the indicated rate of turn. This constant may include the necessary scaling to convert $R_i$ to the rate of change of heading $\dot{\psi}$ during a "standard rate turn" at a given airspeed.

In the above description of the operation of a real rate gyro in an aircraft, it was indicated that prior to the precessional displacement of the gimbal ring and spin axis from a position parallel to the Y axis of the aircraft, the rate gyro was responsive only to the rate of turn $r$ of the aircraft about its Z axis, this being the only angular rotation whose vector had a component at right angles to the gimbal ring. However, once the gimbal ring was displaced, both the rate of turn $r$, and the pitching rate $q_1$ have vector components which are perpendicular to the plane of the gimbal ring and the spin axis. Those skilled in the art and familiar with mathematics of aircraft axis systems will recognize that this relationship may be represented by the following equation:

$$R_i = r \cos(KR_i) + q_1 \sin(KR_i) \qquad (1)$$

When the displacement of the gimbal ring and the rotor spin axis is small (a completely valid assumption in most rate gyros) Equation 1 may be reduced to $$R_i \cong r + q_1 K R_i \qquad (2)$$

By rearrangement Equation 2 may become $$R_i \cong \frac{r}{1-q_1 K} \qquad (3)$$

According to the present invention the contribution of pitching rate $q_1$ of the simulated aircraft (along with the rate of turn $r$ of the simulated aircraft, which is available in the conventional flight computer as a standard quantity) in the derivation of the indicated rate of turn $R_i$ may be determined by mechanizing Equation 2 above.

Two alternative embodiments of such analog computing circuitry are shown in FIGS. 3 and 4 respectively.

Referring now to FIG. 3 a center-tapped potentiometer R–301 is excited at its extremities by means of positive and negative D.C. excitation voltages applied to terminals 301 and 302 respectively, the shaft of potentiometer R–301 being positioned by means of the mechanical shaft output of a conventional rate of turn computer 311 shown in block form. The voltage appearing at the slider of potentiometer R–301, which is evidently a measure of the simulated turning rate, is applied via a summing resistor R–302 to the input of servo amplifier U–301. The output of summing amplifier U–301 will be seen to be connected to the servo motor M–301, and it will be apparent to those skilled in the art that in the absence of any other inputs to servo amplifier U–301, the shaft output of servomotor M–301 would be a measure of the simulated rate of turn. Error-reducing servo follow-up voltage is provided by means of center-tapped potentiometer R–305, which is excited at its extremities by means of steady D.C. negative and positive potentials applied to terminals 303 and 304, respectively, the slider of potentiometer R–305 being positioned according to the shaft output of servomotor M–301, to derive a quantity representing minus $R_i$, the simulated indicated rate of turn, which quantity is applied to the input circuit of servo amplifier U–301 via summing resistor R–304. As stated above, the output of the servo system represented by servo amplifier U–301 and servo motor M–301 would in these circumstances be a direct measure of the simulated rate of turn. It will be observed in FIG. 3 however, that the quantity $-R_i$ appearing as a voltage at the slider of R–305, is applied via summing amplifier U–302 and summing resistor R–306 to excite one extremity of center-tapped potentiometer R–310, the output of summing amplifier U–302 being applied via a further summing amplifier U–303 and summing resistor R–308 to excite the other extremity of center-tapped potentiometer R–310 with the opposite polarity. Resistors R–307 and R–309 are the conventional feedback resistors of conventional feedback amplifiers U–302 and U–303. The positive and negative excitation voltages appearing at the extremities of R–310 are representative of the quantity $\pm KR_i$, the quantity K being the relationship between the simulated gyro axis tilt in radians and the simulated indicated turn velocity corresponding to this tilt, and is entered into the system by means of appropriate resistance scaling. The slider of center-tapped potentiometer R–310 is positioned according to the mechanical shaft output of the $q$, or simulated pitching rate servo shown in block form at 312, in consequence of which the voltage appearing at the slider of potentiometer R–310 is representative of the product $Kq_1R_i$, that is, a measure of the simulated indicated rate of turn modified by the pitching rate of the simulated aircraft. This voltage is applied via summing resistor R–303 to the input circuit of servo amplifier U–301, and thereby constrains the servo system consisting of servo amplifier U–301, and servo motor M–301, to modify its shaft output in accordance with this corrective quantity. The servomechanism output shaft is shown mechanically connected to operate a conventional trainer turn needle of a dummy rate-of-turn indicating device I.

Turning now to FIG. 4, which shows an alternative embodiment according to the instant invention useful in those circumstances in which a servo shaft representation of $q$, the simulated pitching rate, is not available, or useful when the computed simulated rate of turn is not available as a shaft position, a quantity representing $r$, the computed simulated rate of turn, shown derived by means of a conventional rate of turn computer shown in block form at 401, is applied via terminal 401 and a summing resistor R–401 to the input of servo amplifier U–401. Potentiometer R–403 is excited at its extremities by means of negative and positive steady D.C. potentials applied via terminals 402 and 403 respectively, the slider of potentiometer R–403 being positioned by means of the shaft output of servo motor M–401. The voltage appearing at the slider of potentiometer R–403 will evidently be a quantity representing $-R_i$, the simulated indicated rate of turn, and is applied via summing resistor R–402 to the input terminal of servo amplifier U–401. It will be apparent to those skilled in the art that in the absence of any other input to the servo system comprised of servo amplifier U–401 and servo motor M–401, the shaft position of M–401 would be a measure of $R_i$ the simulated rate of turn, center-tapped potentiometer R–403 serving to provide the error reducing follow-up potential necessary to correct position servo system operation. The system has, however, a further potentiometer R–404 excited at its extremities by means of quantities respresenting $-$ and $+q_1$ the simulated pitching rate shown derived by a pitching rate computer shown in block form at 411, and applied via terminals 404 and 405 respectively, the shaft of potentiometer R–404 being positioned by means of the servo shaft output of motor M–401. It will be apparent to those skilled in the art that this expedient effects a multiplication of the simulated indicated rate of turn and $q_1$ the simulated pitching rate of the simulated aircraft. This quantity, which is made to represent $Kq_1R_i$ (the rate of turn modified by $q_1$, the simulated pitching rate of the simulated aircraft and further modified in accordance with K, the gyro axis tilt versus indicated turn velocity constant, which further modification is achieved by means of appropriate resistance scaling), is applied via summing resistor R–405 to the input circuit of servo amplifier U–401. It will be apparent to those skilled in the art that the servo system comprised of servo amplifier U–401 and servo motor M–401, is constrained to produce a shaft position which will be the computed simulated rate of turn modified by the quantity $Kq_1R_i$, the simulated rate of turn modified by the effects of gyrostatic behaviour and the simulated pitching rate of the simulated aircraft, and will evidently represent the simulated indicated rate of turn. The motive means M–401 is shown connected to operate the needle of a conventional dummy rate-of-turn indicating instrument I.

Both Equations 2 and 3 represent the comparatively rigorous relationship between the indicated rate of turn $R_i$ the rate of turn R and the pitching rate $q_1$ in a rate gyro and are limited only by the assumption set forth above.

While Equation 2 shows the relationship between the quantities in a manner that may be conveniently mechanized Equation 3 best illustrates the advantages of the computer circuitry according to the present invention over that of the prior art. Remembering that in the prior art the indicated rate of turn $R_i$ was the product of a constant and the rate of turn $r$, much realism was lost by a failure to consider $q_1$. For example, in maneuvers which involve a large pitching rate $q_1$ but only a small amount of turning rate $r$, it is possible for the term $Kq_1$ to approach unity and the numerator of Equation 3 to become quite small, giving rise to large indicated rate of turn $R_i$ for small quantities of turning rate. Either of the embodiments of the present invention describe means for the relatively rigorous simulation of the large errors which appear in the real rate of turn indicator, which comprises a real rate gyro, due to the contribution of any pitching rate $q_1$. It should be noted, as already suggested, that the quantities the turning rate $r$ and the pitching rate $q_1$ referred to above are standard flight computer quantities and may be derived as exemplified in copending application No. 477,741 dated December 27, 1954 by Laurence E. Fogarty, entitled "Aircraft Trainer Apparatus" and assigned to same assignee as the present invention.

Many deviations from the above disclosure may be made without departing from the present invention. For example, instead of mechanizing Equation 2 as shown in the alternate embodiments of FIGS. 3 and 4, Equation 3 might well be utilized for such mechanization by way of dividing a quantity commensurate with $r$ by a quantity commensurate with $1-Kq_1$. Also, while direct current computation has been used in the above disclosed embodiment it is obvious that the invention may be used using A.C. computation techniques with components adapted for that purpose. While the summing device shown herein are parallel adding amplifiers, differential synchros, mechanical differentials, a variety of equivalent summing devices well known to those skilled in the art may be substituted without departing from the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Grounded flight training apparatus for simulating the operation of a rate of turn indicator of a simulated aircraft, comprising in combination; a simulated rate of turn indicator; computer means for deriving a first potential commensurate with rate of turn of said simulated aircraft; a position servomechanism comprising means for comparing said first potential with the algebraic sum of first and second feedback potentials to derive an error signal and for amplifying said error signal, and motive means responsive to the amplified error signal for positioning said rate of turn indicator; a first potentiometer connected to be positioned by said motive means and operable to derive said first feedback potential, said first feedback potential varying in accordance with the output position of said motive means; computer means for deriving a second potential commensurate with simulated pitching rate of said simulated aircraft; and a second potentiometer connected to be excited in accordance with said second potential and mechanically connected to be positioned by said motive means, thereby to derive said second feedback potential.

2. Grounded flight training apparatus for simulating the operation of a rate of turn indicator of a simulated aircraft, comprising in combination; a simulated rate of turn indicator; computer means for deriving a first potential commensurate with rate of turn of said simulated aircraft; a position servomechanism comprising means for comparing said first potential with the algebraic sum of first and second feedback potentials to derive an error signal and for amplifying said error signal, and motive means responsive to the amplified error signal for positioning said rate of turn indicator; a first potentiometer connected to be positioned by said motive means, whereby said first feedback potential is caused to vary in accordance with the output position of said motive means; computer means for providing a shaft input quantity commensurate with simulated pitching rate of said simulated aircraft; and a second potentiometer connected to be excited in accordance with said first feedback potential and mechanically connected to be positioned by said shaft input quantity, thereby to derive said second feedback potential.

3. Grounded flight training apparatus for simulating the operation of a rate of turn indicator of a simulated aircraft, comprising in combination; a simulated rate of turn indicator; computer means for deriving a first potential commensurate with rate of turn of said simulated aircraft; a position servomechanism comprising means for comparing said first potential with the algebraic sum of first and second feedback potentials to derive an error signal and for amplifying said error signal, and motive means responsive to the amplified error signal for positioning said rate of turn indicator; a first potentiometer connected to be positioned by said motive means and operable to derive said first feedback potential, said first feedback potential varying in accordance with the output position of said motive means; computer means for deriving an input quantity commensurate with simulated pitching rate of said simulated aircraft, and means including a second potentiometer responsive to said pitching rate quantity and the output shaft position of said motive means for deriving said second feedback potential, said second feedback potential being commensurate with the product of said pitching rate quantity and the simulated rate of turn indicated by said simulated rate of turn indicator.

References Cited in the file of this patent

UNITED STATES PATENTS

| | | |
|---|---|---|
| 2,506,998 | Dehmel | May 9, 1950 |
| 2,529,468 | Dehmel | Nov. 7, 1950 |
| 2,536,495 | Ewing | Jan. 2, 1951 |
| 2,656,977 | Cummings | Oct. 27, 1933 |
| 2,697,285 | Dehmel | Dec. 21, 1954 |
| 2,842,867 | Dehmel | July 15, 1958 |